United States Patent [15] 3,638,128
Downs [45] Jan. 25, 1972

[54] PULSE DISCRIMINATOR

[72] Inventor: Robert F. Downs, Santa Ana, Calif.
[73] Assignee: Advanced Technology Center, Inc., Grand Prairie, Tex.

[22] Filed: Dec. 22, 1969
[21] Appl. No.: 886,834

[52] U.S. Cl. ....... 329/126, 307/225, 307/232, 328/38, 329/103, 329/136
[51] Int. Cl. ....... H03d 3/04
[58] Field of Search ....... 329/126, 136, 102, 103; 328/38; 307/233, 232, 220, 225; 325/325

[56] References Cited

UNITED STATES PATENTS

| | | | |
|---|---|---|---|
| 3,149,243 | 9/1964 | Garfield | 307/233 X |
| 3,212,014 | 10/1965 | Wiggins et al. | 307/225 X |
| 3,351,864 | 11/1967 | Scribner | 307/225 X |
| 3,473,133 | 10/1969 | Hummel | 329/126 |

*Primary Examiner*—Alfred L. Brody
*Attorney*—Charles W. McHugh and Richards, Harris & Hubbard

[57] ABSTRACT

Impulse noise effects on pulse-counting discriminators used for converting a frequency-modulated signal into a varying voltage are minimized by a feedback loop that controls the operation of a monostable multivibrator. In pulse-counting discriminators, voltage spikes are produced at a rate related to the frequency of a modulated signal. These spikes trigger the multivibrator that produces an output pulse of predetermined duration for each voltage spike. Output pulses from the multivibrator control the operation of a clamping circuit which, in turn, controls the operation of a ramp generator. A level detector compares the output of the ramp generator to a reference voltage signal and generates a voltage spike when the instantaneous value of the ramp generator output equals the reference signal. This voltage spike also connected to the multivibrator and triggers it to synthesize an output pulse. Operation of the clamping circuit, ramp generator and level detector in conjunction with the multivibrator synthesize an output pulse when one should appear. If the voltage spikes that trigger the multivibrator occur at a frequency in excess of an upper established limit, a second level detector compares the ramp generator output to a second reference signal. This second level detector generates a control signal to inhibit trigger pulses to the monostable multivibrator.

13 Claims, 5 Drawing Figures

INVENTOR
ROBERT F. DOWNS

Richards, Harris & Hubbard
ATTORNEY

INVENTOR

ROBERT F. DOWNS

Richards, Harris & Hubbard

ATTORNEY

INVENTOR

ROBERT F. DOWNS

Richardson, Harris & Hubbard

ATTORNEY

PULSE DISCRIMINATOR

This invention relates to a pulse-counting discriminator for converting a frequency-modulated signal into a varying voltage. And more particularly to a pulse-counting discriminator where the linear operation is extended into a threshold region.

Of the two basic types of discriminator circuits in general use today, the digital type is considered to have numerous advantages. The basic component of the digital discriminator is a multivibrator. In many prior art discriminator circuits, the multivibrator is of the bistable design and requires a feedback circuit to produce a series of output pulses related to the frequency of a modulated signal.

The second type of discriminating circuit in general use today employs reactive elements whose impedance changes as a function of the frequency passing through the circuit. Tuned circuits are often incorporated in such discriminating circuits. One measure of fidelity of a discriminator circuit is the point on the output signal-to-noise ratio versus input carrier-to-noise ratio curve at which this curve departs from linearity. This point of departure from a linear curve is known as the "threshold." Threshold extension techniques have been incorporated in reactive element circuits to improve the noise performance. This technique employs a phase comparator, a low-pass filter, and a voltage-controlled oscillator in a closed loop fashion to produce a demodulated output. Another technique employs a frequency-modulated feedback loop which serves to narrow the effective bandwidth of the modulated signal. Its operation is similar to a tracking filter.

In prior digital discriminator circuits, much effort has been expended on obtaining accurate pulse widths from the multivibrator. Little investigation, however, was made to improve the performance of the digital discriminator by minimizing the effects of noise, that is, to extend the threshold level.

An object of the present invention is to provide a pulse-counting discriminator having improved noise performance. Another object of this invention is to provide a pulse-counting discriminator for extending the linear region of a performance characteristic. Still another object of this invention is to provide a pulse-counting discriminator for minimizing the effect of impulse noise existing in the transmission path of a communications signal. A further object of this invention is to provide a discriminator circuit to limit the frequency output within a preestablished bandwidth.

In accordance with one embodiment of this invention, voltage spikes are generated at a repetition rate related to the frequency of a modulated signal. These voltage spikes are coupled to a circuit that generates an output pulse of fixed duration for each voltage spike connected thereto. The fixed-duration output pulses are converted by filtering into a voltage that varies with the instantaneous frequency of the modulated signal. These pulses are also applied to the input of a clamping circuit that clamps the output of a ramp generator at a fixed level for each output pulse. When no output pulse exists at the input of the clamping circuit, the ramp generator has an output voltage that increases with time. If the value of this ramp voltage increases to the level of a reference signal, a level detector senses the equality and generates a voltage spike which will also trigger the circuit for producing output pulses of fixed duration. Both the voltage spikes related to the frequency of the modulated signal and the level detector spike are coupled to the output generator through a gating circuit.

In accordance with another embodiment of this invention, voltage spikes produced at a rate related to the frequency of a modulated signal are coupled to a multivibrator through two serially connected gates. Output pulses from the multivibrator activate a clamping circuit which controls a ramp generator in the manner as described previously. A first level detector connected to the output of the ramp generator and to a first reference voltage signal produces a voltage spike whenever the two inputs thereto are equal. A second level detector, also connected to the ramp generator, produces a control voltage to one of the serially connected gates whenever the ramp generator output and a second reference voltage signal have a predetermined relationship.

A more complete understanding of the invention and its advantages will be apparent from the specifications and claims and from the accompanying drawings illustrative of the invention.

Referring to the drawings.

Figure 1:
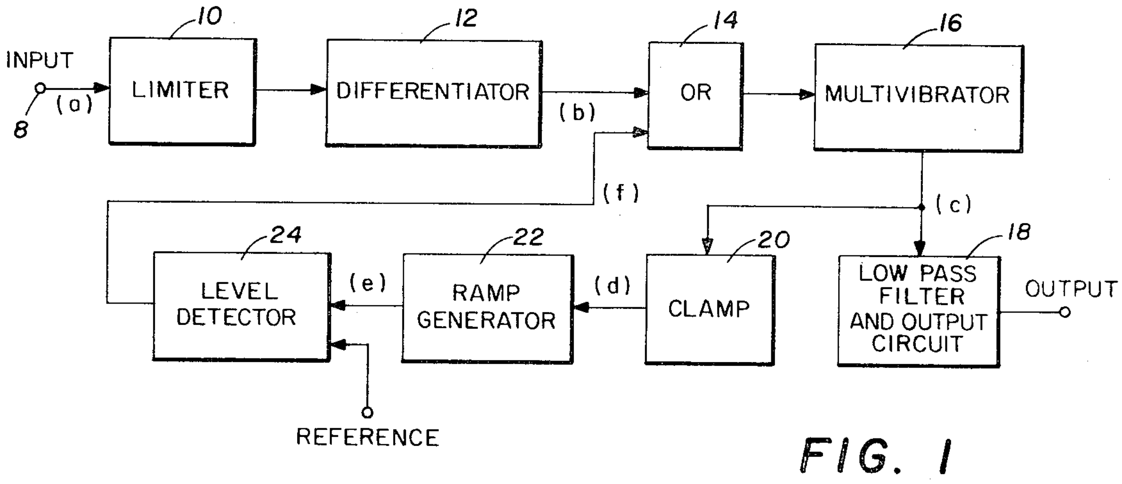
FIG. 1 is a block diagram of a digital pulse-counting network for converting a frequency-modulated signal into varying voltage.

Referring to FIG. 1, there is shown an input terminal 8 for receiving an AC input signal of varying frequency. This signal may constitute a frequency-modulated signal which is to be converted to a varying DC voltage level in accordance with changes in the input frequency. The incoming signal is applied to the input terminal of a limiter 10 that generates a frequency-modulated, rectangular pulse train output. This train of rectangular pulses is differentiated in a differentiator 12 to provide a number of positive and negative voltage spike, trigger pulses per second. The number of pulses provided is directly proportional to the frequency of the incoming signal. Voltage spikes from the output of the differentiator 12 are applied to one input of an OR-gate 14 which is biased to pass only the positive-going pulses and suppress all negative-going pulses. It should be understood that the OR-gate could be biased to pass the negative-going pulses and suppress the positive-going pulses. This is a matter of choice determined by the overall operation of the discriminator circuit.

From the output of the OR-gate 14, the positive trigger pulses are applied to the input of a monostable multivibrator 16. The heart of the pulse discriminator is the monostable multivibrator 16; it produces a fixed amplitude, constant width, rectangular wavetrain of pulses. One pulse is produced at the output of the multivibrator for each voltage pulse spike connected to the input.

Pulses at the output of the multivibrator 16 are processed by a low-pass filter and output circuit 18. The filter has a bandwidth that is ideally equal to the base bandwidth of the incoming signal. An output voltage from the low-pass filter reflects the original modulating information and a DC term proportional to the carrier frequency. Capacitance coupling between the output of the low-pass filter and the output circuit removes the DC term leaving the original modulating information. The output circuit may be an amplifier with a desired gain.

If the bandwidth occupied by the modulating information (base band) is known, which is almost always the case, then the maximum separation in time from the preceding to the succeeding instantaneous carrier cycle is known. If the occurrence of the cycle is later than the known maximum separation, then it can be concluded that the excessive duration is caused by noise and is therefore undesirable.

To minimize the effects caused by noise on the output of the discriminator, the output of the multivibrator 16 is also applied to a clamping circuit 20 that controls the operation of a ramp generator 22. When the output of the multivibrator 16 is in a transitory state, that is, in a post-triggered state, the clamping circuit 20 restricts the ramp generator 22 from producing an output signal.

Upon return of the multivibrator output to its stable state, the clamping circuit 20 releases the ramp generator 22 which starts to generate a ramp voltage that increases with time. The resulting ramp from the generator 22 is compared to a DC reference voltage signal in a level detector 24. When the instantaneous value of the ramp voltage exceeds the reference voltage signal, the detector 24 produces an output pulse that is applied to the OR-gate 14 which triggers the multivibrator 16 to produce an output pulse. The multivibrator 16 again activates the clamping circuit 20 to reset the ramp generator 22.

Thus, the loop including the clamping circuit 20, the ramp generator 22 and the level detector 24 synthesizes an output pulse from the multivibrator 16. The pulse is produced at a time considered to be the maximum separation between pulses for the bandwidth occupied by the modulating information (base band).

Figure 2:
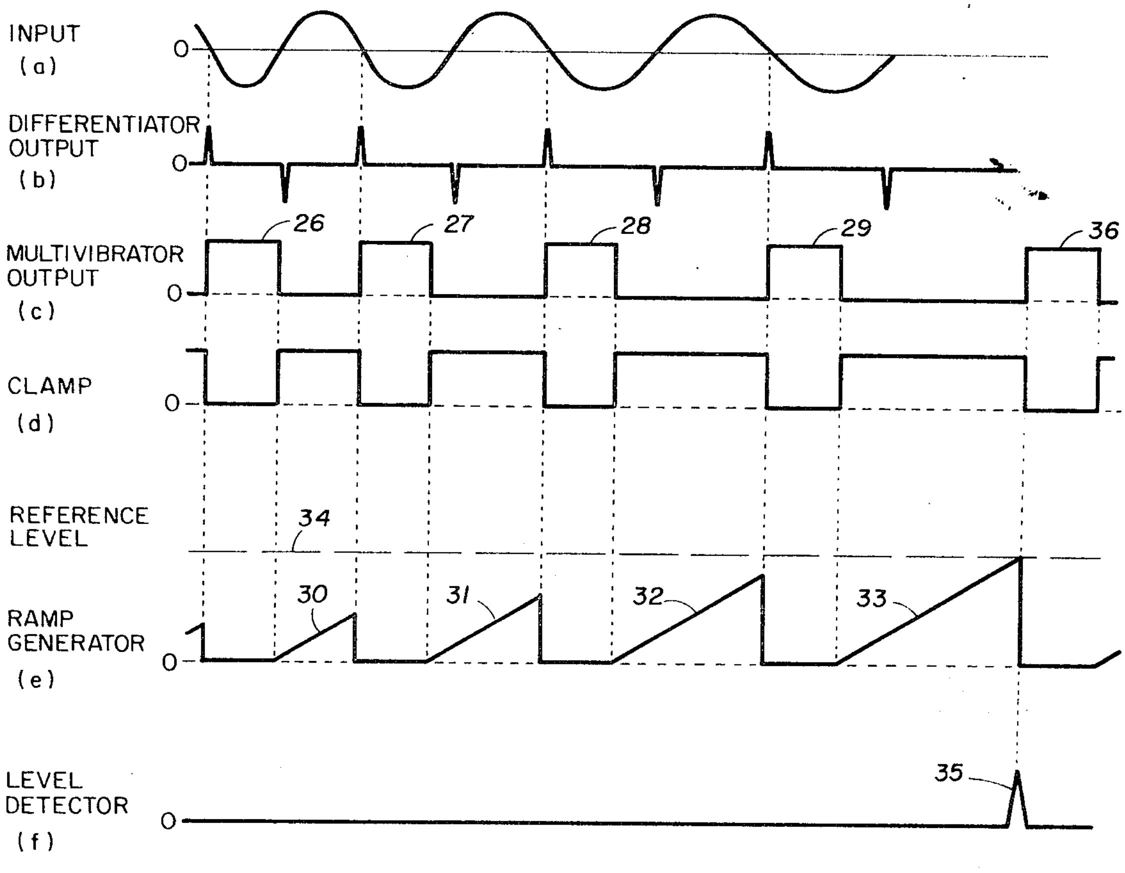
FIG. 2 is a series of waveforms generated at various points of the circuit of FIG. 1.

A better understanding of the foregoing operation will be had by now referring to the series of waveforms illustrated in FIG. 2.

A frequency-modulated signal having a wave shape as illustrated by curve (*a*) is applied to the limiter 10 and from the limiter 10 to the differentiator 12. As illustrated at curve (*a*), the frequency of the incoming signal applied to the terminal 8 varies with each cycle. An incoming signal usually does not vary in frequency in the manner illustrated but remains constant for a period of time. The wave shape given is to illustrate the operation of the system of FIG. 1.

At the output of the differentiator 12, a series of narrow, positive and negative voltage spike pulses 16 produced as illustrated by the waveform of curve (*b*). A positive pulse is produced each time the negative-going portion of the incoming signal passes through zero and a narrow negative-going is produced each time the positive-going portion of this signal passes through zero. As is evident, these pulses will occur at each crossover of the zero voltage line of the incoming sinusoidal-shaped wave.

By biasing the OR-gate 14 to pass only the positive-going pulses, a voltage spike for triggering the multivibrator 16 occurs once for each cycle of the input waveform. Each voltage spike applied to the multivibrator 16 triggers the circuit into its transitory state thereby changing the output of the multivibrator from one voltage level to a second voltage level. After a predetermined period of time, the output of the multivibrator 16 returns to its original state. The train of output pulses from the multivibrator 16 resulting from the positive spikes as illustrated by curve (*b*) are shown in curve (*c*) and identified as pulses 26 through 29.

Each time the multivibrator 16 produces an output pulse, the output of the clamping circuit 20 is driven to a zero voltage level as indicated by the waveform of curve (*d*). Thus, the waveshape of the output of the clamping circuit 20 is the inverse of the output of the multivibrator 16; the circuit 20 may be an inverter amplifier. During those periods when the clamp output is at the zero level, the output of the ramp generator 22 will be clamped to a fixed level. As illustrated by the wave shape of curve (*e*), the output of the generator 22 is clamped to the zero voltage level. When the output of the clamping circuit 20 returns to a positive value, a ramp voltage is generated at the output of the generator 22. The slope of this ramp is fixed by the parameters of the system. At the termination of pulse 26, a sawtooth-shaped pulse 30 appears at the output of the ramp generator 22. The length of time this ramp increases is determined by the leading edge of the pulse 27. Upon the termination of pulse 27, the sawtooth-shaped pulse 31 appears at the output of the generator 22. The ramp has a time duration determined by the leading edge of the pulse 28. Similarly, the sawtooth-shaped pulse 32 is produced between the pulses 28 and 29.

At the termination of the pulse 29, the sawtooth-shaped pulse 33 is generated at the output of the ramp generator 22. This ramp continues until it equals the reference voltage signal connected to the level detector 24 and is indicated by line 34 of curve (*e*). When the instantaneous values of the sawtooth-shaped pulse 33 equals the reference voltage signal as given by line 34, the level detector 24 produces a voltage spike 35 as indicated by curve (*f*). The voltage spike 35 is applied through the OR-gate 14 to trigger the multivibrator 16 which consequently generates the output pulse 36 as indicated at curve (*c*). Pulse 36 has been synthesized by the level detector operation. The time between the trailing edge of a pulse 29 and the leading edge of the pulse 36 is determined by the bandwidth occupied by the modulating information (base band).

Any noise superimposed upon the modulated carrier of the incoming signal at terminal 8 may cause late-occurring or missing pulses at the output of the multivibrator 16. The system of FIG. 1 essentially determines whether the occurrence of a cycle is excessively late (or absent) and, if so, synthesizes it. By synthesizing an output pulse at the multivibrator 16, the effects of noise are minimized at the output of the system as generated by the low-pass filter and output circuit 18.

Figure 3:
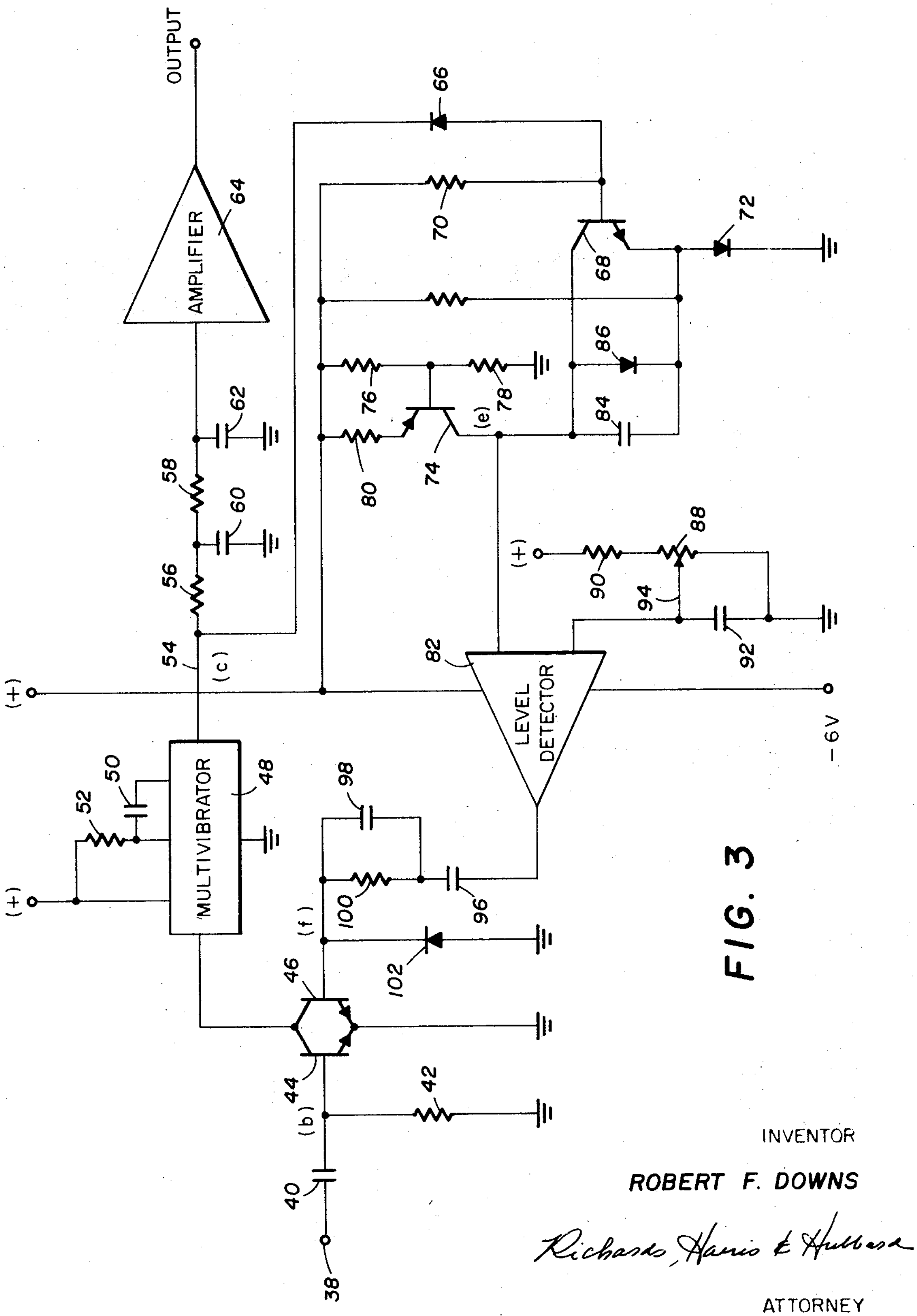
FIG. 3 is a schematic of one embodiment of a threshold extension, pulse-counting discriminator.

Referring to FIG. 3, there is shown a transistorized schematic of a pulse-counting discriminator employing circuitry for minimizing the noise effect. An input sine wave is passed through a limiter, which may constitute an overdriven amplifier, to provide a square wave to a terminal 38. The leading and trailing edges of the square wave at the terminal 38 are differentiated to produce positive and negative voltage spikes by a differentiator circuit that includes a capacitor 40 and a resistor 42. Voltage spikes at the interconnection of the capacitor 40 and the resistor 42 provide a base drive for a transistor 44 of an inverting pair that includes a transistor 46. By properly biasing the transistor 44, as shown, only positive pulse produced by the differentiator will appear at the output of the inverting pair at the common connection between the collector electrodes of the transistors 44 and 46. These negative-going pulses are connected to the input terminal of a monostable multivibrator 48 having a feedback loop including a capacitor 50 and a resistor 52 for establishing fixed duration pulses on an output line 54. Any one of many commercially available multivibrators may be used in the circuit illustrated.

Fixed-duration, positive pulses on the line 54 at the output of the multivibrator 48 are applied to the low-pass filter consisting of resistors 56 and 58 connected to capacitors 60 and 62, respectively. The filter output at the junction of the resistor 58 and the capacitor 62 is applied to the input of an amplifier 64 by means of capacitance coupling. The output of the amplifier 64 will be a voltage varying in accordance with the original modulating information.

Output pulses on the line 54 are also applied to a NAND gate as a clamping circuit. Tied to the line 54 is a diode 66 having an anode electrode connected to the base electrode of a clamping transistor 68. Also connected to the base electrode of the transistor 68 is a biasing resistor 70 having a second terminal connected to the positive terminal of a DC supply (not shown). Connected to the emitter electrode of the transistor 68 is a diode 72 having a cathode electrode tied to ground.

Transistor 68 along with the diodes 66 and 72 and the resistor 70 provides one form of a clamping circuit. Whenever an output pulse from the multivibrator 48 appears on the line 54, such as any one of the pulses 26 through 29 and 36, of FIG. 2, curve (*c*), the diode 66 becomes back-biased, thereby turning on the transistor 68 and clamping the collector electrode thereof to a potential one-diode drop above ground.

The collector electrode of the transistor 68 is tied to the output of a ramp generator that includes a transistor 74. A base-biasing circuit for the transistor 74 includes resistors 76 and 78 tied between a positive terminal of a DC supply and ground. A resistor 80 establishes the emitter current in the transistor 74. This circuit comprises one form of a constant current source.

As mentioned, the collector electrode of the transistor 74 connects to the collector electrode of the transistor 68; it also connects to the input terminal of a level detector 82. A signal appearing at the collector electrode of the transistor 74 increases linearly with time along a ramp. The slope of this ramp is controlled by a timing circuit consisting of a capacitor 84 and the constant current source described above. Diode 86 limits the maximum voltage applied to level detector 82 and provides overdrive protection therefor.

In addition to the output of ramp generator at the collector electrode of the transistor 74, the level detector 82 has a second input connected to a reference supply source consisting of a variable resistor 88 in series with a fixed resistor 90 connected to the positive terminal of a DC supply (not shown). A capacitor 92 provides a smoothing filter for the reference level voltage established at the wiper arm 94 of the variable resistor 88.

When the two inputs to the level detector 82 are in a predetermined relationship to each other, for example, when the instantaneous value of the ramp generator output equals the reference level, a control signal appears at the output of the detector. This control signal is applied to a conditioning circuit consisting of capacitors 96 and 98 along with a resistor 100 and a diode 102. The capacitor 98, resistor 100, and the diode are interconnected to the base electrode of the transistor 46. A control signal at the output of the level detector 82 appears at the base electrode of the transistor 46 as a voltage spike similar to that produced at the base electrode of the transistor 44. This voltage spike will turn on the transistor 46 and apply a trigger pulse to the multivibrator 48 in a manner as described previously with respect to FIG. 1.

Operationally, the system of FIG. 3 is similar to that described above with regard to FIGS. 1 and 2. The wave shape of curve (*b*) of FIG. 2 appears at the junction of the capacitor 40 and the resistor 42. Fixed-duration pulses, as illustrated by curve (*c*), are generated on the line 54 at the output of the multivibrator 48. Under the control of the transistor 68, the collector voltage of the transistor 74 would appear as the wave shape of curve (*e*). When the level detector 82 senses a predetermined relationship between its two inputs, the base drive to the transistor 46 would appear as the voltage spike 35 as given by curve (*f*) of FIG. 2.

Figure 4:
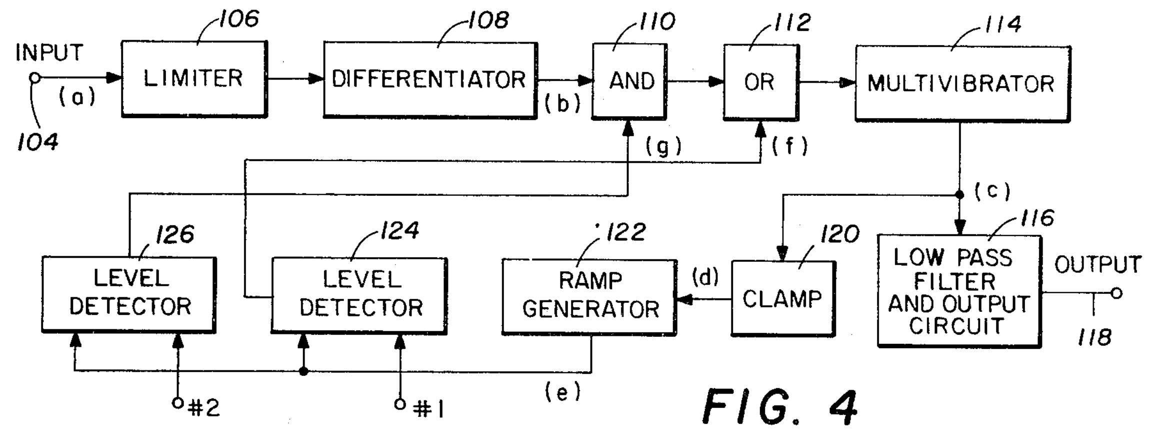
FIG. 4 is a block diagram of a bipolar, noise correction, pulse-counting discriminator.

Referring to FIG. 4, there is shown an extension of the system of FIG. 1 that synthesizes a trigger pulse to the multivibrator after a predetermined period of time and also prevents an excessive number of trigger pulses from being applied to the multivibrator. Accordingly, the system of FIG. 4 controls the frequency of the output pulses of a multivibrator between an upper limit and a lower limit.

An input sine wave is applied to an input terminal 104 and passes through a limiter 106 which, as explained, may constitute an overdriven amplifier to provide a square wave input to a differentiator 108. Positive and negative voltage spikes generated at the output of the differentiator 108, by differentiation of the leading and trailing edges of the output of the limiter 106, are applied to one terminal of an AND-gate 110 which functions as a normally open switch. When conditioned to pass the output of the differentiator 108, voltage spikes are coupled through an OR-gate 112 to the input of a monostable multivibrator 114.

Fixed-duration pulses appearing at the output of the monostable vibrator 114 are simultaneously applied to a clamping circuit 120 and a low-pass filter and output circuit 116 that produces the system output on a terminal 118. The clamping circuit 120 controls the operation of a ramp generator 122 which has an output that increases with time and is applied to one input of a level detector 124 and one input of a level detector 126. The level detector 124 also has a reference voltage input to establish the maximum time between subsequent pulses at the output of the multivibrator 114. When the reference voltage applied to the detector 124 has a predetermined relationship to the output of the ramp generator 122, e.g., when they are equal, the level detector 124 generates a voltage spike which is applied to the OR-gate 112 to trigger the multivibrator 114. A reference voltage for establishing the maximum number of trigger pulses that can be applied to the multivibrator 114 is applied to the second input of the level detector 126. When this second reference voltage attains a predetermined relationship to the output of the reference generator 122, the level detector 126 produces a switch drive signal to the AND-gate 110. The output of the level detector 126 conditions the AND-gate 110 to pass voltage spikes appearing at the output of the differentiator 108.

Figure 5:
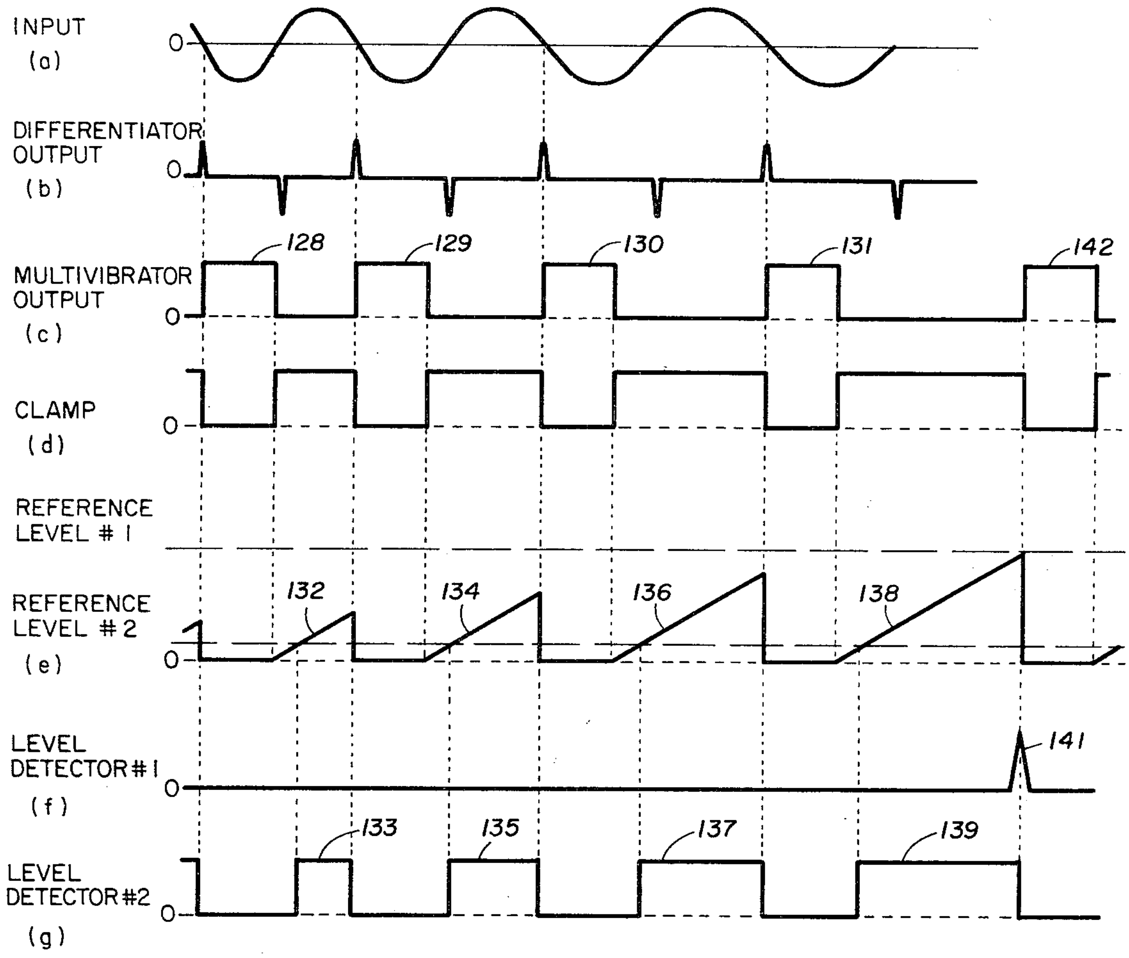
FIG. 5 is a series of waveforms generated at various points of the circuit of FIG. 4.

A better understanding of the foregoing operation will be had now by referring to the series of waveforms illustrated in FIG. 5.

Waveforms illustrated at curves (*a*) through (*f*) are similar to those illustrated and described in FIG. 2. A sine wave input at the terminal 104, as illustrated by the waveform of curve (*a*), produces the positive and negative voltage spikes at the output of the differentiator 108 as illustrated at curve (*b*). Each positive-going voltage spike of curve (*b*) triggers the multivibrator 114 to produce output pulses 128 through 131.

Output pulses of the multivibrator activate the clamping circuit 120 to control the ramp generator 122. Control of the ramp generator 122 by means of the clamping circuit 120 results in a waveform, as illustrated in curve (*e*) to be generated at one input of the level detectors 124 and 126. The reference voltage No. 2, applied to the second input of the detector 126, is set at a value determined by the upper frequency limit of the modulated information. Whenever the ramp output of the generator 122 equals this reference voltage, the detector 126 produces a switch drive signal to condition the AND-gate 110 for passing voltage spikes from the differentiator 108 to the OR-gate 112.

Where the ramp 132 of curve (*e*) exceeds the second reference level, the control pulse 133, as illustrated at the curve (*g*), is produced by the detector 126. During the time interval of pulse 133, the AND-gate 110 is conditioned to pass a trigger pulse from the differentiator 108. At the leading edge of the pulse 129 at the output of the multivibrator 114, the ramp generator output is clamped to zero and the output of the level detector 126 also returns to the zero level. Upon the termination of the pulse 129, the ramp 134 is generated. When the level of the ramp 134 exceeds the second reference level, the control pulse 135 is generated by the level detector 126. During the time interval of the pulse 135, the AND-gate 110 is conditioned to pass voltage spikes to the multivibrator 114. At the leading edge of the pulse 130 at the output of the multivibrator 114, the ramp generator 122 is clamped to zero and the output of the level detector 126 returns to zero. This operation continues for the ramps 136 and 138 to produce control pulses 137 and 139, respectively, for controlling the AND-gate 110. Note that the ramp 138 is terminated by a voltage spike 141 generated by the level detector 124. Since the spike 141 produces an output pulse 142, the ramp generator output is clamped to zero and the output of the level detector 126 returns to zero voltage level.

Should a voltage spike appear at the output of the differentiator 108, due to noise impulses or other unwanted signals, during the times between the control pulses 133, 135, 137 and 139, they would be blocked from the OR-gate 112 by the AND-gate 110. Thus, the maximum number of pulses allowed to be passed to the multivibrator 114 is controlled by the level detector 126.

By properly establishing the parameters of the system; rates, ramp slope and level detector reference, the level detector 124 activates the multivibrator 114 when the instantaneous frequency drops below the lowest instantaneous frequency of the system (due to the base band information). Similarly, by properly selecting parameters of the level detector 126, an upper bound is placed on the system instant oneous carrier frequency and the maximum number of pulses (at the system output) will be clamped at a predetermined limit.

While only preferred embodiments of the present invention, together with modifications thereof, have been described in detail herein and shown in the accompanying drawings, it will be evident that various further modifications are possible without departing from the scope of the invention.

What is claimed is:

1. A discriminator for converting a frequency-modulated signal into a varying voltage comprising:
   circuit means for producing output pulses of predetermined duration at a repetition rate related to the frequency of a modulated input signal,
   means for converting said pulses into a voltage that varies with the frequency of the modulated signal,
   a ramp generator having an output voltage that increases with time, clamping means responsive to the output pulses of said circuit means for clamping the output of said ramp generator at a fixed level during each output pulse,
means for comparing the output of said ramp generator with a reference voltage and generating a control voltage when said signals are in a predetermined relationship, and
means for coupling the modulated input signal and the control voltage from said comparing means to said circuit means for controlling the number of output pulses produced thereby.

2. A discriminator for converting a frequency-modulated signal into a varying voltage as set forth in claim 1 wherein said comparing means includes a level detector that produces a voltage when the reference voltage and the ramp voltage are equal.

3. A discriminator for converting a frequency-modulated signal into a varying voltage as set forth in claim 2 wherein said coupling means includes an OR gate that reproduces at an output terminal a signal appearing at either of two inputs.

4. A discriminator for converting a frequency-modulated signal into a varying voltage as set forth in claim 3 wherein said clamping means is an NAND gate having an input connected to said circuit means and an output to said ramp generator.

5. A discriminator for converting a frequency-modulated signal into a varying voltage as set forth in claim 4 wherein said circuit means is a monostable multivibrator.

6. A pulse-counting discriminator for converting a frequency-modulated signal into varying voltage comprising:
means for producing voltage spikes at a period related to the frequency of a modulated signal,
circuit means for producing output pulses of predetermined duration for each voltage spike connected thereto,
means for converting said pulses into a voltage that varies with the frequency of the modulated signal,
a ramp generator having an output voltage that increases with time,
clamping means responsive to the output pulses of said circuit means for clamping the output of said ramp generator at a fixed level during each output pulse,
means for comparing the output of said ramp generator with a reference voltage and generating a voltage spike when said signals are in a predetermined relationship, and
means for coupling the voltage spikes related to the frequency of the modulated signals and from said comparing means to said circuit means.

7. A pulse-counting discriminator for converting a frequency-modulated signal into a varying voltage comprising:
means for producing voltage spikes at a period related to the frequency of a modulated signal,
circuit means producing output pulses of predetermined duration for each voltage spike connected thereto,
means for converting said pulses into a voltage that varies with the frequency of the modulated signal,
a ramp generator having an output voltage that increases with time,
clamping means responsive to the output pulses of said circuit means for clamping the output of said ramp generator at a fixed level during each output pulse,
means for comparing the output of said ramp generator with a reference signal and generating a voltage spike when said signals are in a predetermined relationship,
means for coupling the voltage spikes related to the frequency of the modulated signal and from said comparing means to said circuit means,
means for comparing the output of said ramp generator with a second reference signal and generating a control signal when said voltages are in a predetermined relationship, and
switching means responsive to the control signal for disconnecting the voltage spikes related to the frequency of the modulated signal from said coupling means.

8. A pulse-counting discriminator for converting a frequency-modulated signal into a varying voltage as set forth in claim 7 wherein said first comparing means includes a level detector that produces a voltage spike when the reference voltage and the ramp voltage are equal, and
said second comparing means also includes a level detector that produces a control signal where the reference voltage and the ramp output are in a predetermined relationship.

9. A pulse-counting discriminator for converting a frequency-modulated signal into a varying voltage as set forth in claim 8 wherein said clamping means is a NAND gate having an input connected to said circuit means and an output to said ramp generator.

10. A pulse counting discriminator for converting a frequency-modulated signal into varying voltage as set forth in claim 9 wherein said circuit means is a monostable multivibrator.

11. A pulse-counting discriminator for converting a frequency-modulated signal into a varying voltage comprising:
means for producing voltage spikes at a period related to the frequency of a modulated signal;
an inverter pair having one input responsive to the voltage spikes related to the frequency of the modulated signal,
a monostable multivibrator having an input connected to the output of said inverter pair for producing output pulses of predetermined duration for each voltage spike from said inverter pair,
means for converting said pulses into a voltage that varies with the frequency of the modulated signal,
a first transistor having a base electrode and an emitter electrode interconnected to a voltage source, and a collector electrode connected to a capacitor for generating a voltage at the collector electrode that increases with time,
a second transistor having a base electrode connected to the output of said monostable multivibrator through a diode, a collector electrode connected to the collector electrode of said first transistor, and an emitter electrode connected to ground for clamping the output of said first transistor at a fixed level during each output pulse,
means for comparing the output at the collector electrode of said first transistor with a reference signal and generating a voltage spike connected to the second input of said inverter pair when said voltages are in a predetermined relationship.

12. A pulse-counting discriminator for converting a frequency-modulated signal into a varying voltage as set forth in claim 11 wherein said inverter pair comprises two transistors having interconnected collector and emitter electrodes with the output of said pair of interconnected collector electrodes.

13. A pulse-counting discriminator for converting a frequency-modulated signal into a varying voltage as set forth in claim 11 wherein said converting means includes a low-pass filter connected to the input of an amplifier circuit.

* * * * *